United States Patent Office 3,495,003
Patented Feb. 10, 1970

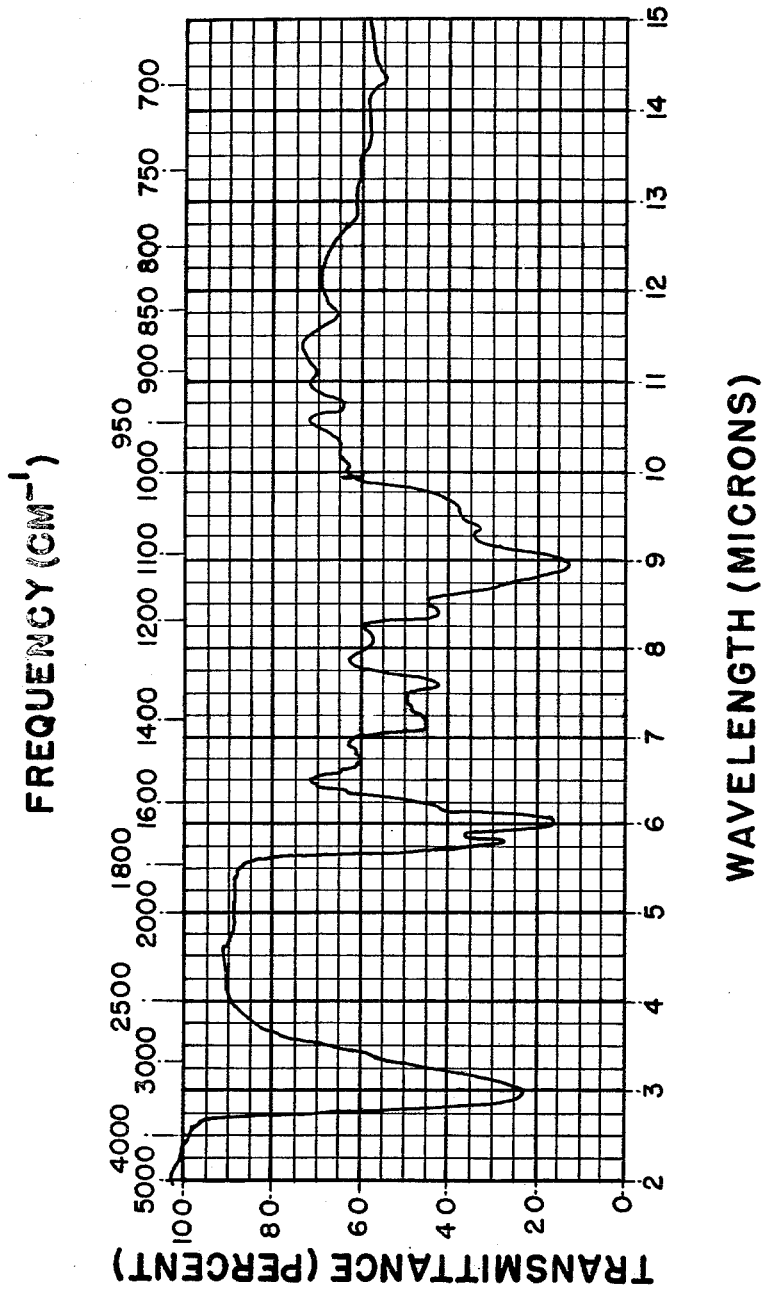

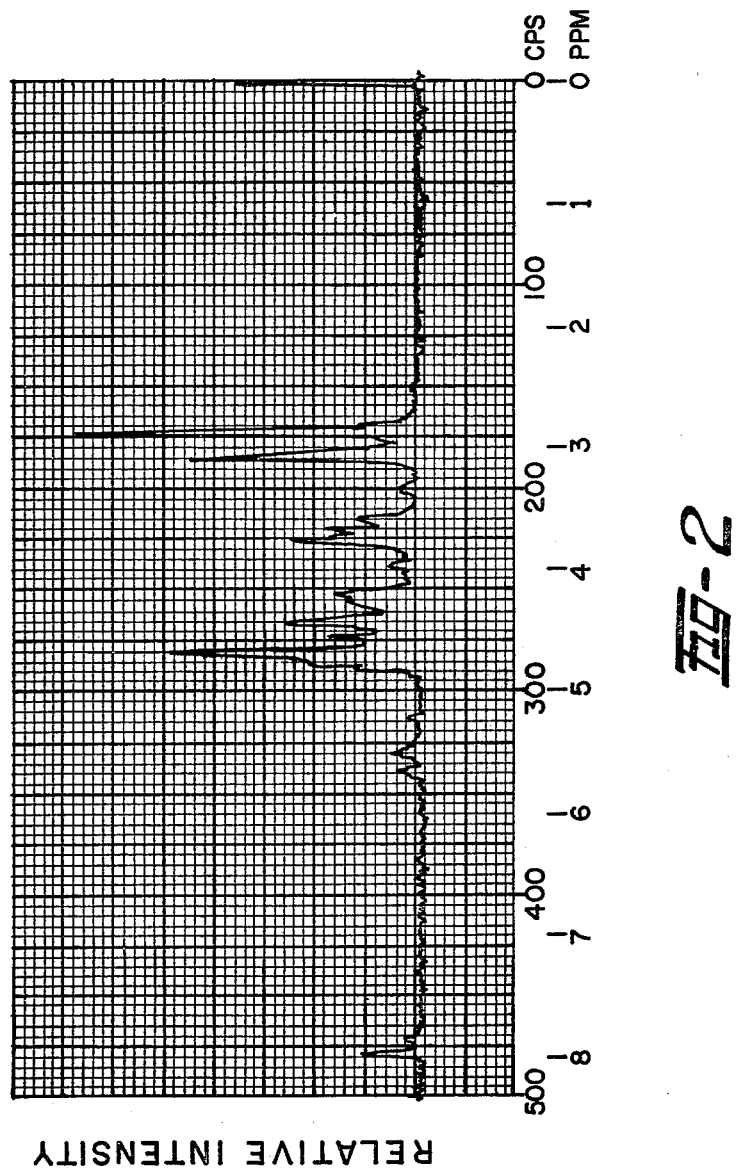

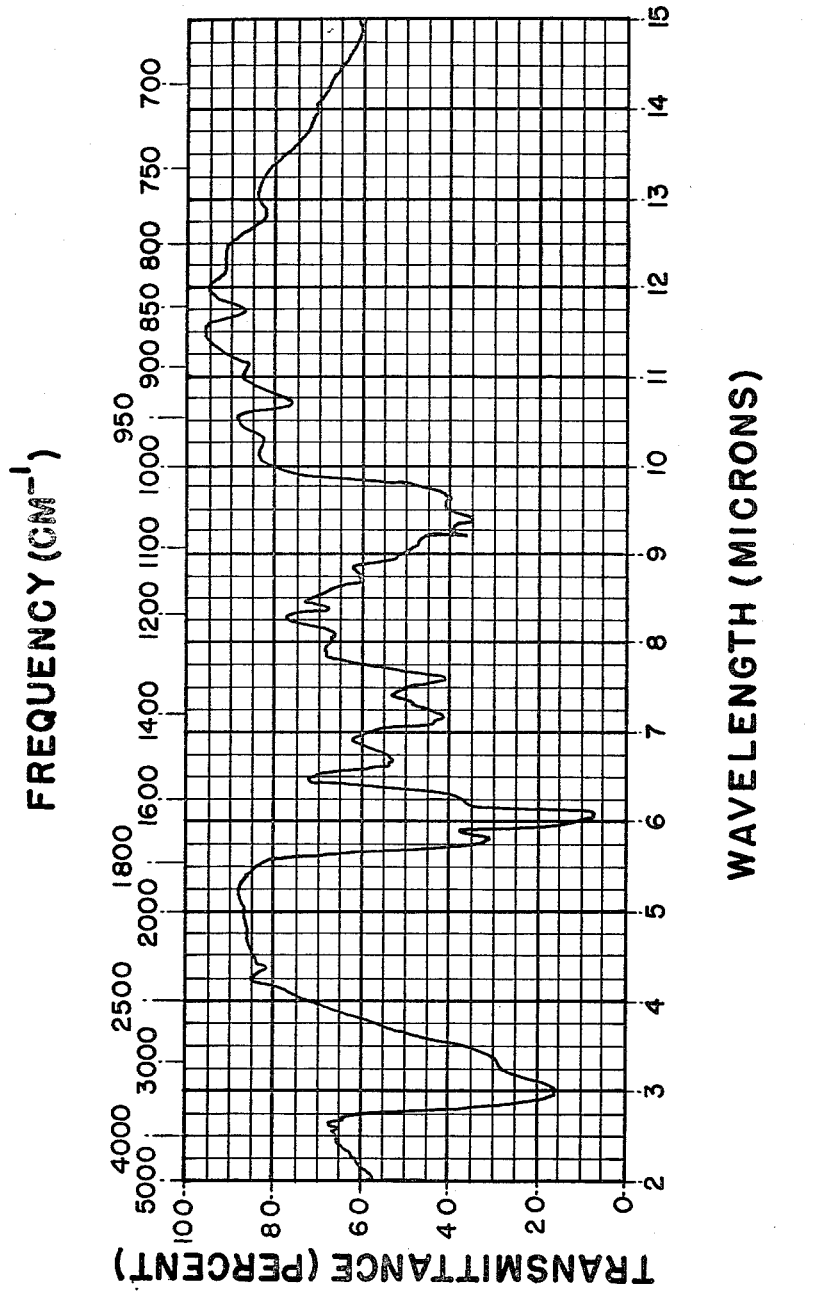

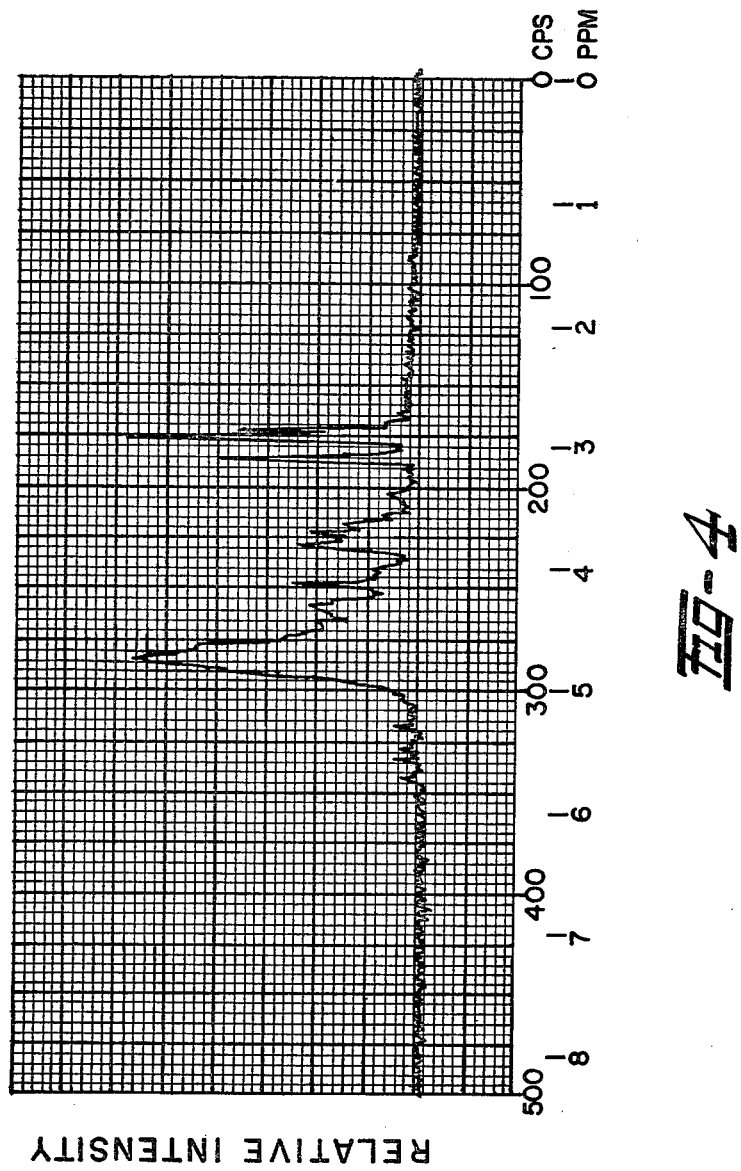

3,495,003
ANTIBIOTIC AB-664 AND PRODUCTION THEREOF
Werner Karl Hausmann, Chazy, and Samuel Owen Thomas, Pearl River, N.Y., assignors to American Cyanamid Company, Stamford, Conn., a corporation of Maine
Continuation-in-part of application Ser. No. 666,912, Sept. 11, 1967. This application Aug. 20, 1968, Ser. No. 753,861
Int. Cl. C07g 11/00; A61k 21/00
U.S. Cl. 424—116     4 Claims

ABSTRACT OF THE DISCLOSURE

A new antibiotic is produced, designated AB-664 by cultivating a new strain of *Streptomyces candidus* NRRL 3083. The new antibiotic is active against gram-positive and gram-negative organisms and thus is useful in inhibiting the growth of such bacteria wherever they may be found.

---

This application is a continuation-in-part of our copending application Ser. No. 666,912 filed Sept. 11, 1967, now abandoned, which, in turn, is a continuation-in-part of application Ser. No. 363,600, filed Apr. 29, 1964, now abandoned.

This invention relates to a new antibiotic, to its production by fermentation, to methods for its recovery and concentration from crude solutions, to processes for its purification and to the preparation of its salts.

The present invention includes within its scope the antibiotic in dilute forms, as crude concentrates, and in pure crystalline forms. These novel products are active against a variety of microorganisms including gram-positive and gram-negative bacteria. The effects of the new antibiotic on specific microorganisms, together with its chemical and physical properties, differentiate it from previously described antibiotics.

The new antibiotic, which we have designated AB-664, is formed during the cultivation under controlled conditions of a new strain of a species known as *Streptomyces candidus*. This streptomycete was isolated from a soil sample collected in Auburn, Ala. A viable culture of the new strain of *Streptomyces candidus* has been deposited with the Culture Collection Laboratory, Northern Utilization Research and Development Division, United States Department of Agriculture, Peoria, Ill., and has been added to its permanent collection. It is freely available in this repository under its Accession Number NRRL 3083.

The following is a general description of the organism based on the diagnostic characteristics observed.

*Amount of growth.*—Moderate to good on most media.

*Aerial Mycelium and/or en masse spore color.*—Aerial mycelium and spores white. Sporulation moderate to heavy on most media.

*Soluble pigment.*—No soluble pigment produced.

*Reverse color.*—In yellowish shades on most media.

*Miscellaneous physiological reactions.*—Nitrates reduced on both organic and inorganic nitrate broth; complete liquefaction of gelatin in 14 days; no melanin produced on peptone-iron agar. Carbon source utilization according to Pridham et al. [J. Bact. 56: 107–114 (1948)] as follows: Good to fair utilization of d-fructose, lactose, d-mannitol, d-xylose, i-inositol, d-trehalose and dextrose; poor to non-utilization of 1-arabinose, dextran, adonitol, d-melezitose, d-melibiose, d-raffinose, 1-rhamnose, salicin and sucrose.

*Morphology.*—Spores in long straight to flexuous chains. Spores elongate $0.6-0.8\mu \times 0.8-1.2\mu$ with smooth walls as determined by electron microscopy.

The taxonomic position of this new culture was found, when using different systematic keys, to be among the white-spored Streptomycetes having straight to flexuous spore chains. When compared to the original descriptions and with available reference cultures, the new isolate corresponded closest with the species concept of *Streptomyces candidus* and will be considered a strain of that species.

The cultural, morphological and physiological characteristics of the new strain of *Streptomyces candidus* when grown on several media, including those recommended by Pridham et al. ["A Selection of Media for Maintenance and Taxonomic Study of Streptomyces," Antibiotics Annual (1956–1957), pages 947–953], are set forth in Tables I, II, III and IV. The descriptive colors are taken from Ridgway "Color Standards and Color Nomenclature" (1912), TABLE I.—CULTURAL CHARACTERISTICS OF *Streptomyces candidus* NRRL 3083
[Incubation, 14 days; Temperature, 28° C.]

| Medium | Amount of growth | Aerial mycelium and/or spores | Soluble pigment | Reverse color | Remarks |
|---|---|---|---|---|---|
| Czapek's solution agar | Moderate | Aerial mycelium and spores white; sporulation moderate. | None | Ivory yellow | |
| Tomato paste agar | do | do | do | Light cadmium | |
| Bennett's agar | do | do | do | Buff-yellow | |
| Asparagine dextrose agar | do | do | do | Apricot yellow | |
| Hickey and Tresner's agar | do | do | do | Buff-yellow | |
| Carvajal's oatmeal agar | Good; spreading | Aerial mycelium and spores white; sporulation heavy. | do | Apricot yellow | Moderate colorless to yellowish exudate; colonies raised. |
| Potato dextrose agar | Good | do | do | Antimony yellow | Colonies raised. |
| Tomato paste oatmeal agar | do | do | do | Ochraceous-buff | Abundant colorless exudate; colonies raised. |
| Yeast extract agar | Moderate | Aerial mycelium and spores white; sporulation moderate. | do | Ochraceous-tawny | Colonies raised. |
| Inorganic salts, starch agar | Good | do | do | Buff-yellow | Colonies raised; light colorless exudate. |
| Oat flake agar | Moderate | do | do | do | Colonies raised; moderate colorless exudate. |

TABLE II.—MICROMORPHOLOGY OF *Streptomyces candidus* NRRL 3083

| Medium | Aerial mycelium and/or sporiferous structures | Spore shape | Spore size | Spore surface |
|---|---|---|---|---|
| Tomato paste | Spores in long straight to flexuous chains | Elongate; smooth | 0.6–0.8μ x 0.8–1.2μ | [1] |

[1] Smooth-walled as determined by electron microscopy.

TABLE III.—MISCELLANEOUS PHYSIOLOGICAL REACTION OF *Streptomyces candidus* NRRL 3083
[Temperature, 28° C.]

| Medium | Incubation period | Amount of growth | Physiological reaction |
|---|---|---|---|
| Synthetic nitrate broth | 7 days | Moderate | Positive nitrate reduction. |
| Do | 14 days | do | Do. |
| Organic nitrate broth | 7 days | do | Do. |
| Do | 14 days | do | Do. |
| Peptone-iron agar | 24 hours | do | No melanin produced. |
| Gelatin | 7 days | Good | Partial liquefaction. |
| Do | 14 days | do | Complete liquefaction. |

TABLE IV

Carbon source utilization pattern of *Streptomyces candidus* NRRL 3083

Incubation: 14 days; temperature: 28° C.

| Carbon source: | Utilization [1] |
|---|---|
| Adonital | 0 |
| l-Arabinose | 1 |
| Dextran | 1 |
| d-Fructose | 3 |
| i-Inositol | 2 |
| Lactose | 3 |
| d-Mannitol | 3 |
| d-Melezitose | 0 |
| d-Melibiose | 0 |
| d-Raffinose | 0 |
| l-Rhamnose | 0 |
| Salicin | 0 |
| Sucrose | 0 |
| d-Trehalose | 2 |
| d-Xylose | 3 |
| Dextrose | 2 |
| Negative control | 0 |

[1] 3=Good utilization; 2=fair utilization; 1=poor utilization; 0=no utilization.

It is to be understood that for the production of antibiotic AB-664, the present invention is not limited to this particular organism or to organisms fully answering the above growth and microscopic characteristics which are given for illustrative purposes. In fact, it is desired and intended to include the use of mutants produced from the described organism by various means, such as X-radiation, ultraviolet radiation, nitrogen mustard, phage exposure and the like.

THE FERMENTATION PROCESS

The cultivation of the new strain of *Streptomyces candidus* NRRL 3083 may take place in a variety of liquid culture media. Media which are useful for the production of antibiotic AB-664 include an assimilable source of carbon such as starch, sugar, molasses, glycerol, etc., an assimilable source of nitrogen such as protein, protein hydrolysate, polypeptides, amino acids, corn steep liquor, etc., and inorganic anions and cations such as potassium, sodium, calcium, sulfate, phosphate, chloride, etc. Trace elements such as boron, molybdenum, copper, etc. are supplied as needed in the form of impurities by other constituents of the media. Aeration in tanks and bottles is provided by forcing sterile air through or onto the surface of the fermenting medium. Further agitation is provided in tanks, by a mechanical impeller. An antifoaming agent, such as 1% octadecanol in lard oil may be added as needed.

SHAKER FLASK FERMENTATION

For shaker flask fermentations, 100-milliliter sterile portions of the following liquid inoculum in 500 milliliter flasks are inoculated with an agar slant of the culture.

| Liquid inoculum: | Grams per liter |
|---|---|
| Soybean oil meal | 10.0 |
| Glucose | 20.0 |
| Corn steep liquor | 5.0 |
| $CaCO_3$ | 3.0 |

The flasks are incubated at about 28° C. on a reciprocating shaker and agitated vigorously for 24 to 72 hours, usually for 48 hours.

TANK FERMENTATION

For the production of the antibiotics in tank fermentors the following fermentation medium is preferably used.

| Fermentation medium: | Grams per liter |
|---|---|
| Glucose | 10 |
| Corn steep liquor | 5 |
| Molasses | 20 |
| Soybean oil meal | 10 |
| Calcium carbonate | 3 |

Each tank is inoculated with from 0.1 to 10% inclusive, of a culture broth fermented as described above for shaker flask fermentation. Aeration is supplied at the rate of 0.2–2.0 volumes, inclusive, of sterile air per volume of broth per minute and the broth is agitated by an impeller driven at 400–800 r.p.m. The temperature is maintained at 20–35° C., usually at 28° C. The fermentation may be continued for from 24 to 240 hours, at which time the mash is harvested.

ISOLATION PROCEDURE

After the fermentation is completed, the fermented mash containing the antibiotic of this invention is adjusted to from about pH 5.0 to 7.0 with dilute mineral acid. The mixture is filtered, preferably with the addition of diatomaceous earth or any other conventional filter aid, to remove the mycelium. Normally, the mycelial filter cake is washed with a small portion of water, and the water wash is combined with the filtrate.

The antibiotic may be extracted from the filtrate by adsorption on activated carbon or by passage through an ion exchange resin. Ordinarily when activated carbon is employed as an adsorbant it is added in sufficient quantity to make a suspension of about 0.5 to 2.0% (w./v.) concentration in the mash filtrate. A suitable quantity of filter aid is added, and after stirring for about 10 to 30 minutes, the suspension is filtered. The carbon cake, which contains about 95% of the antibiotic activity, is stirred with about 10 volumes of a mixture of methanol and water (80:20), adjusted to pH 2.0 to 2.5 with strong mineral acid, for about 30 minutes, and the suspension is filtered. Optionally, the carbon cake may be re-extracted with an additional portion of the methanol-water mixture. Concentration of the methanolic extract under reduced pressure and gradual adjustment of the pH to about 4.5 to 5.0 with ammonium hydroxide during the concentration yields 4 to 10 liters of an aqueous solution, which may contain as much as 50 g. of the antibiotic mixture from a 300-liter fermentation.

PURIFICATION PROCEDURE

Further purification of the antibiotic activity and its separation into two components, termed AB–664α and AB–664β, may be effected by use of ion exchange resin columns. Optionally, the activated carbon adsorption step just described may be omitted, carrying out the ion exchange purification directly on the mash filtrate. The mash filtrate, however, contains large amounts of salts and other products that may compete with the antibiotic for a place on the resin lattice and it has been found that the ion exchange purification is more effective when it is carried out after adsorption on carbon and subsequent elution.

In general, any carboxylic acid type resin, either in its acid or alkali metal ion form, may be used in the purification. In practice, the aqueous concentrate obtained from the methanol-water extract is charged slowly onto a previously prepared resin column in its acid form. Assays run on the eluate show that the antibiotic activity is largely retained on the resin. The column is washed with water, then with 50% aqueous methanol, and then with methanol in order to remove impurities. No appreciable loss of antibiotic activity is found on assay of the washes. The column is further washed with water and the antibiotic eluted with dilute mineral acid. When dilute sulfuric acid is used, the effluent containing antibiotic may be neutralized to pH 4.5–7.0 with barium hydroxide and the resulting barium sulfate is filtered out to minimize buildup of salts in the product.

The purification effected by the adsorption on activated carbon, elution, and passage of the concentrate through the ion exchange resin is sufficient to allow the separation of the antibiotic into components AB–664α and AB–664β on a second ion exchange column. In this column carboxylic acid type resin is again used but is pretreated to neutralize the acid groups by the addition of ammonium or alkali metal hydroxide until an aqueous suspension of the resin is from about pH 6.5 to 7.0.

The neutralized, filtered effluent obtained from the previous column is concentrated under reduced pressure and charged onto the prepared resin column. The column is developed to effect separation with gradient aqueous solutions of various salts. Salts such as sodium chloride, potassium chloride, sodium sulfate, and magnesium chloride may be used. With sodium sulfate, for example, a gradient elution from 0.5 M to 1.0 M will elute the α and β components separately.

The β component is eluted first, and is usually completely separated from the α component as shown by paper bioautography. When sodium sulfate is used as the eluant, the components are obtained as the sulfate salts.

Alternatively, a purification procedure using activated carbon may be used in place of or subsequent to the second resin column as described in the examples.

PHYSICAL CHARACTERISTICS

The novel antibiotics of this invention, AB–664α and AB–664β, may be distinguished by selected physical characteristics.

Components AB–664α and AB–664β contain the elements carbon, hydrogen, nitrogen, and oxygen. The formate salt and the sulfate salt of AB–664α contain the indicated elements in substantially the following percentages by weight:

|  | Formate salt | Sulfate salt |
| --- | --- | --- |
| Carbon | 40.67 | 35.21 |
| Hydrogen | 6.08 | 5.52 |
| Nitrogen | 18.07 | 17.48 |
| Sulfur |  | 5.54 |

The α component has no distinctive melting point. Optical rotation of the sulfate salt is $[\alpha]_D^{25} = -59°$ (C=2.004 in water). The ultraviolet absorption spectrum shows end absorption; no visible absorption is present. An infrared absorption spectrum of the AB–664α component as its sulfate salt in a KBr pellet is prepared in a standard manner. It exhibits characteristic absorption in the infrared region of the spectrum at the following wavelengths expressed in microns: 3.02 (s. broad), 5.87 (s.), 6.06 (s. broad), 6.23 (sh.), 7.30 (w.), 7.63 (m.), 8.12 (w.), 8.42 (m.), 8.75 (sh.), 8.9 (s. broad), 9.35 (m.), 9.60 (sh.), 10.72 (w.), 11.15 (w.), 11.75 (w.).

The infrared curve is shown in FIGURE 1 of the accompanying drawings.

A proton magnetic resonance spectrum of AB–664α as the sulfate salt, after trice repeated solution in D₂O and lyophilization, followed by solution in D₂O (45 mg. in 0.3 ml.) containing 3-(trimethylsilyl)-1-propanesulfonic acid sodium salt as an internal standard is determined with a Varian A–60 spectrometer at 60 megacycles in the customary manner. The compound has a characteristic resonance pattern with principal features occurring at the following frequencies expressed as cycles/sec. downfield from the standard: 173, 185, 200, 220 (multiplet), 238 (multiplet), 252 (multiplet), 265 (broad), 273, 330–340 (doublet) and 479. The proton magnetic resonance spectrum is shown in FIGURE 2 of the accompanying drawings.

The chloride salt of AB–664β contains the indicated elements in substantially the following percentages by weight:

Carbon _____ 33.3
Hydrogen _____ 6.61
Nitrogen _____ 17.20
Chlorine _____ 15.16

The β component has no distinctive melting point. Optical rotation is $[\alpha]_D^{25} = -82 \pm 3$ (C=2.0 in water).

An infrared absorption spectrum of the AB–664β component as its chloride salt in a KBr pellet is prepared in a standard manner. It exhibits characteristic absorption in the infrared region of the spectrum at the following wavelengths expressed in microns: 3.0 (s. broad), 5.84 (s.), 6.05 (s.), 6.65–6.72–6.77 (m., triplet), 7.40 (m.–s.), 7.61 (m.–s.), 8.1 (w.), 8.4 (w.), 8.72–8.76 (w., doublet), 9.37 (m.), 9.5–9.63 (m., sh.), 10.25–10.35 (w.), 10.72 (w.), 11.14 (w.), 11.75 (w.), 12.85 (w.).

The infrared curve of AB–664β as the chloride is shown in FIGURE 3 of the accompanying drawings.

The proton magnetic resonance spectrum of the chloride salt of AB–664β obtained with a Varian A–60 spectrometer at 60 megacycles in the customary manner on a sample dissolved in D₂O, and using an external tetramethylsilane standard, shows a characteristic resonance pattern with principal features occurring at the following frequencies expressed as cycles/sec. downfield from the standard: 172, 176, 186, 203, 220–225 (multiplet), 248, 256 (multiplet), 217, 322, 328, 333, and 348. Other frequencies may be concealed in the H₂O–HOD resonance (265–300 c.p.s.). No resonance is found at 475–480 c.p.s. The proton magnetic resonance spectrum is shown in FIGURE 4 of the accompanying drawings.

The in vitro antimicrobial activity of the new antibiotics is presented in the table below which shows the minimal inhibitory concentration required to inhibit the growth of representative microorganisms in a nutrient medium using an agar dilution method.

TABLE V.—IN VITRO ANTIBACTERIAL ACTIVITY

| Organism | Minimal inhibitory concentration, µg./ml. | |
|---|---|---|
| | AB-664α | AB-664β |
| Mycobacterium smegmatis ATCC 607 | 12 | 25 |
| Staphylococcus aureus strain Rose | 50 | 50 |
| Staphylococcus aureus strain Smith | 100 | 100 |
| Streptococcus pyogenes C 230 | 5 | 5 |
| Klebsiella pneumoniae KAD | 12 | 12 |
| Enterobacter aerogenes 75 | 12 | 25 |
| Pseudomonas aeruginosa ATCC 10145 | >100 | >100 |
| Proteus vulgaris ATCC 9484 | 5 | 12 |
| Escherichia coli U-311 | 12 | 12 |
| Escherichia coli DY | 12 | 12 |
| Salmonella typhosa ATCC 6539 | 12 | 12 |

AB-665α is active in vivo against a variety of gram-positive and gram-negative microorganisms such as staphylococci, pneumococci, and streptococci. The new antibiotics are thus potentially useful as therapeutic agents in treating bacterial infections in mammals caused by such microorganisms. The new antibiotics can be expected to be usefully employed for controlling such infections by topical application or parenteral administration.

The usefulness of the new antibiotics is demonstrated by the ability of AB-664α to control systemic lethal infections in mice. The new antibiotic shows high in vivo antibacterial activity in mice against Staphylococcus aureus, strain Smith, Escherichia coli, strain 311, Klebsiella pneumoniae, strain AD, and Salmonella typhosa, strain 6539 when administered by a single subcutaneous dose to groups of Carworth Farms CF-1 female mice, weight about 20 grams, infected intraperitoneally with a lethal dose of these bacteria in $10^{-2}$, $10^{-3}$, $10^{-4}$ and $10°$ trypticase soy broth (TSP) dilutions, respectively, of a five-hour TSP blood culture.

Table VI below illustrates the in vivo antibacterial activity of AB-664α.

TABLE VI.—IN VIVO ANTIBACTERIAL ACTIVITY OF AB-664α
[Alive/total mice, 14 days after infection]

| Dosage, mg./kg. body wt. | Staphylococcus aureus strain Smith | Escherichia coli strain 311 | Klebsiella pneumoniae strain AD | Salmonella typhosa strain 6539 |
|---|---|---|---|---|
| 40 | 9/10 | 8/10 | 18/20 | |
| 20 | 14/20 | 19/20 | 12/20 | 19/20 |
| 10 | 2/20 | 13/20 | 5/20 | 18/20 |
| 5 | 0/10 | 4/20 | 1/20 | 9/20 |
| 2.5 | | 0/20 | | 0/10 |

Infected non-treated control mice:

*Staphylococcus aureus*, strain Smith, 80/80 mice died within 1 day after infection.

*Escherichia coli*, strain 311, 39/40 mice died within 1 day after infection.

*Klebsiella pneumoniae*, strain AD, 40/40 mice died within 1 day after infection.

*Salmonella typhosa*, strain 6539, 39/40 mice died within 2 days after infection.

The α and β components are also active against PPLO infections in chicks. The data are shown in Tables VII and VIII below.

TABLE VII.—THE EFFECT OF AB-664 AGAINST *Mycoplasma gallisepticum* INFECTIONS IN EMBRYONATED EGGS

| | Embryos Alive/Total (percent living) on 12th Day | |
|---|---|---|
| | AB-664α 3990-7A | AB-664β, 3990-7B |
| Dose, mg./embryo: | | |
| 1 | 10/18(56) | 16/19(84) |
| 0.25 | 6/17(35) | 8/19(42) |
| 0.06 | 0/16(0) | 2/18(11) |
| None | | 0/38(0) |

TABLE VIII.—THE EFFECT OF AB-664 AGAINST *M. gallisepticum* INFECTIONS IN CHICKS
[Single Injection on Day of Infection]

| | Each Number Represents Mean Wt. for 20 Chicks (21 Days Post Infection) | |
|---|---|---|
| | AB-664α, 3990-7A | AB-664β, 3990-7B |
| Dose, mg./chick: | | |
| 2.5 | 259 | 297 |
| 0.5 | 238 | 243 |
| None (infected) | 216-222 | |
| None (non-infected) | 303-311 | |

The invention will be described in greater detail in conjunction with the following specific examples.

EXAMPLE 1

Inoculum preparation

The medium used to grow the primary inoculum is prepared according to the following formula:

| | | |
|---|---|---|
| Corn steep liquor | grams | 5.0 |
| Soybean oil meal | do | 10.0 |
| Glucose | do | 20.0 |
| $CaCO_3$ | do | 3.0 |
| Water | liter | 1.0 | pH adjusted to 6.5 with NaOH.

A yeast-malt agar slant of a culture of the new strain of *Streptomyces candidus* NRRL 3083 is incubated for a week. At this time spores and mycelium are transferred to two 500-milliliter flasks, each containing 100 milliliters of the above sterile medium. The flasks are placed on a reciprocating shaker and agitated for 48 hours at 28° C. At the end of this time, the flask inocula are used to seed a 5-gallon glass fermentor containing 12 liters of medium.

EXAMPLE 2

Fermentation

A fermentation medium is prepared according to the following formula:

| | | |
|---|---|---|
| Corn steep liquor | grams | 5 |
| Glucose | do | 10 |
| Molasses | do | 20 |
| Calcium carbonate | do | 3.0 |
| Soybean oil meal | do | 10.0 |

Water to 1.0 liter.

Twelve liters of the above medium are placed in a five-gallon glass fermentor and sterilized in an autoclave with steam pressure at 120° C. for 45–60 minutes. The pH of the medium is about 7.1 before sterilization and drops to about 6.8 after sterilization. The medium is then inoculated with 200 milliliters of a 2-day inoculum described in Example 1. The fermentation is agitated by an impeller operating at 400 r.p.m. and aerated at a rate of 0.0325 c.f.m. The temperature during the course of the fermentation is between 26° C. and 28° C. The fermentation is harvested 93 hours after inoculation.

EXAMPLE 3

Isolation 300 liters of fermented mash are filtered with about 2% (w./v.) of diatomaceous earth filter aid and the filter pad is washed with about 30 liters of water. The filtrate (pH 7.0) contains substantially all of the antibiotic produced in the fermentation mash. The activity in the filtrate is adsorbed on about 12 kg. of Darco G-60 (filtrate is pH 4.0 to 8.0) with stirring for 2 to 30 minutes. About 2 kg. of filter aid is added and the mixture is filtered. The wet carbon filter cake is treated with about 35 liters of a mixture of methanol and water (80:20) which is adjusted to pH 2.5 with hydrochloric acid. The elution is carried out by percolation of the carbon filter cake with the aqueous methanol. A second treatment of the carbon with an additional 35 liters of acidified aqueous methanol assures complete elution of the antibiotic. The combined aqueous methanol extracts are adjusted with ammonium hydroxide to about pH 4.6 and concentrated under reduced pressure to about 9 liters to remove the methanol. The concentrate contains approximately 75% of the antibootic activity produced in the fermentation mash.

Before further purification is carried out, calcium ions are largely removed from the above concentrate by precipitation as calcium oxalate. A saturated solution of sodium oxalate in water is added to the concentrate until further addition gives no more precipitate. The pH of the concentrate is kept between 5.0 to 8.0. The calcium oxalate is filtered and the filtrate is percolated slowly through a column of Amberlite IRC-50 ion exchange resin (6.0×60 cm., 50-100 mesh) in acid form. The column is washed with water until most of the color is removed, and then with methanol until nearly colorless effluent is obtained. The column is rinsed with water and eluted with about 1 N sulfuric acid. The fraction containing the activity, about the first 1,500-2,000 ml. after the acid front, as determined by bioassay, is neutralized to pH 5.0 to 7.0 with barium hydroxide and the resulting precipitate of barium sulfate is separated by filtration. The dilute filtrate is concentrated under reduced pressure to a volume of about 2 liters.

The antibiotic mixture contained in the filtrate, comprising 20-30 g. as judged by bioassay, is separated into its components by a second resin column. A concentrate of about 10 g. of the antibiotic mixture is washed with water into the second column containing Amberlite IRC-50 resin in the sodium form (6.0×60 cm., 50-100 mesh), and the antibiotics AB-664α and AB-664β are separated by gradient elutioin using 9 liters of water and 9 liters of 1.0 M sodium sulfate. Fractions of about 100 ml. each are collected and tested for antibiotic activity by paper chromatography and bioautography using filter paper discs saturated with samples of the various fractions and dried. The β component is eluted from the column first, followed by a mixture of the two components which in turn is followed by the α component. Appropriate fractions are combined to form an AB-664α pool and an AB-664β pool.

Each pool is assayed separately and treated with Darco G-60 to obtain further purification. Darco G-60 (about 20 g. per gram of antibiotic) is added to each pool cooled to 3° C., and the suspensions are stirred for about 10 minutes. The cold suspensions are filtered separately and the carbon from each pool is washed with ice-cold distilled water until the washes give only a trace of precipitate on addition of barium chloride solution. The respective carbon filter cakes containing each component are eluted by suspending in ice-cold, 10-50 percent acetone-water for about fifteen minutes and subsequent filtration. About 100 ml. of the acetone-water mixture is used for each 10 g. of Darco G-60. The resulting filtrates are evaporated under reduced pressure to remove the acetone, and the residual aqueous solutions are lyophilized yielding substantially pure AB-664α and AB-664β, in the form of sulfate salts.

The chemical analysis of each of the alpha and beta components of AB-664 and the other physical and biological properties of the new antibiotic have already been described.

EXAMPLE 4

Alternate isolation procedure

[The starting material used for further purification here is material obtained from a regular fermented mash by adsorption on carbon and elution therefrom, and purified further by adsorption on one Amberlite IRC-50 column and elution therefrom with dilute hydrochloric acid as described in Example 3 above.]

A mixture of 500 g. of Darco G-60 and 1,500 g. of Celite 545 is suspended in distilled water to make a thick suspension and is well stirred. The suspension is poured into a glass column (3″ diameter with lower opening contricted to 0.4″) with the lower opening plugged loosely with glass wool. The column is allowed to settle overnight and 100 ml. (40 g. solid) of an aqueous solution obtained from a preliminary Amberlite IRC-50 column is washed onto the column with about 6,250 ml. of water. The first 3 liters of effluent is collected as a single fraction, and then nine 500 ml. fractions are collected. Nitrogen is passed through the column to remove most of the water and the moist Darco G-60, Celite 545 mixture is removed in twenty equal fractions. Each fraction is separately suspended in 300-350 ml. of 20% acetone-water and stirred for 10-30 minutes. Each suspension is then filtered and the solids pad is resuspended in fresh 20% acetone-water, stirred and the mixture filtered. The two filtrates from each fraction are combined, concentrated under reduced pressure to remove the acetone, and the residual aqueous solutions are lyophilized. Paper chromatography on the various solids fractions is carried out using descending chromatography with Whatman No. 1 paper strips developed with the lower phase of a solvent system composed of m-cresol (200 parts), pyridine (1 part), glacial acetic acid (1 part), and water (100 parts). Bioautography of the strips, after drying and washing with ethyl ether to remove m-cresol, is carried out on agar plates (pH 6.0) inoculated with *Bacillus subtilis*. Those fractions showing zones at $R_f$ 0.4 to 0.5 contain the AB-664α component and constitute, generally, the fractions of the upper half of the column. The several intermediate fractions contain both components, while pure AB-664β is obtained from the lower fractions of the column, or in the aqueous eluate from the column that is collected at 500 ml. fractions.

EXAMPLE 5

Preparation of AB-664α formate salt

A solution of partially purified AB-664 antibiotic, as obtained from the first Amberlite IRC-50 column described in Example 3, containing about 8.5 g. of both components as the sulfate salts, is charged onto a column of CM Sephadex (4.4×30 cm.). The Sephadex resin is eluted with an aqueous solution containing 1.2% ammonium formate, and active fractions are detected by bioautography. Descending paper chromatography is carried out on samples of the active fractions, wherein the strips are developed using the lower phase of a solvent system composed of m-cresol (200 parts), pyridine (1 part), glacial acetic acid (1 part), and water (100 parts). Bioautography of the strips after drying and washing with ethyl ether to remove m-cresol, is carried out an agar plates (pH 6.0) inoculated with *Bacillus subtilis*. Fractions showing zones at $R_f$ 0.45 to 0.50 contain the α-component and are collected and assayed. About 35 g. of Darco G-50 is added to the combined fractions cooled to 0-5° C., and the suspension is stirred for about 20 minutes and then filtered. The carbon is washed with ice-cold distilled water until the washes give only a slightly positive or a negative test for ammonium ion with Nessler's Reagent. The carbon cake is suspended in 500 ml. of ice-cold 20% acetone-water for about 15 minutes, the suspension is filtered and the cake is washed.

Acetone is removed from the combined filtrate and wash by concentration under reduced pressure. The aqueous phase is lyophilized to yield 1.735 g. of pure AB-664α formate.

Elemental analysis: Percent
Carbon _____ 38.69
Hydrogen _____ 5.94
Nitrogen _____ 17.63

Optical rotation: $[\alpha]_D^{25} = -59°$ (C=2.0 in water).

EXAMPLE 6

Preparation of AB–664α sulfate salt

A solution of 1.15 g. of AB–664α formate salt, prepared as described in Example 5, in 20 ml. of methanol is treated dropwise during stirring at room temperature with a solution of 0.1 ml. of concentrated sulfuric acid in 5 ml. of methanol. Precipitation of the sulfate salt begins almost immediately. After all of the methanolic sulfuric acid is added the suspension is cooled and the AB–664α sulfate salt separated by filtration and washed with methanol. On drying, about 960 mg. of the dry salt is obtained.

What is claimed is:

1. A substance antibiotic AB–664α effective in inhibiting the growth of gram-positive and gram-negative bacteria which in sulfate form is characterized as follows:

| Analysis: | Percent |
|---|---|
| Carbon | 35.21 |
| Hydrogen | 5.52 |
| Nitrogen | 17.48 |
| Sulfur | 5.54 |

Optical rotation: $[\alpha]_D^{25} = -59°$ (C=2.004 in water).

Infrared spectrum: as shown in FIGURE 1.

Proton magnetic resonance spectrum: as shown in FIGURE 2.

2. A substance antibiotic AB–664β effective in inhibiting the growth of gram-positive and gram-negative bacteria which in chloride form is characterized as follows:

| Analysis: | Percent |
|---|---|
| Carbon | 33.3 |
| Hydrogen | 6.61 |
| Nitrogen | 17.20 |
| Chlorine | 15.16 |

Optical rotation: $[\alpha]_D^{25} = -82° \pm 3$ (C=2.0 in water).

Infrared spectrum: as shown in FIGURE 3.

Proton magnetic resonance spectrum: as shown in FIGURE 4.

3. A compound selected from the group consisting of antibiotic AB–664α as characterized in claim 1 and antibiotic AB–664β as characterized in claim 2.

4. A process which comprises cultivating *Streptomyces candidus* NRRL 3083 in an aqueous nutrient medium containing assimilable sources of carbohydrate, nitrogen and inorganic salts under submerged aerobic conditions for a period of from 24 to 240 hours and at a temperature of from 20 to 35° C. until substantial antibacterial activity is imparted to said medium by the production of a compound as characterized in claim 3, and then separating the compound into two components AB–664α and AB–664β by partition column chromatography.

References Cited

UNITED STATES PATENTS 3,344,025   9/1967   Whaley et al. _____ 424—121

ALBERT T. MEYERS, Primary Examiner

J. D. GOLDBERG, Assistant Examiner

U.S. Cl. X.R.

195—80; 424—117